United States Patent [19]

Bietenhader et al.

[11] Patent Number: 5,474,424
[45] Date of Patent: Dec. 12, 1995

[54] ROTORCRAFT ROTOR HEAD, WHICH IS RIGID IN DRAG AND ARTICULATED IN PITCH AND FLAPPING

[75] Inventors: Claude Bietenhader, Lambesc; Robert J. Suzzi, Marseilles, both of France

[73] Assignee: Aerospatiale Societe Nationale Industrielle, Paris Cedex, France

[21] Appl. No.: 224,171

[22] Filed: Apr. 7, 1994

Related U.S. Application Data

[63] Continuation of Ser. No. 907,576, Jul. 2, 1992, abandoned.

[30] Foreign Application Priority Data

Jul. 3, 1991 [FR] France .................... 91 08323

[51] Int. Cl.$^6$ .................................. B64C 27/35
[52] U.S. Cl. ......................... 416/134 A; 416/141
[58] Field of Search .................. 416/134 A, 138, 416/140, 141

[56] References Cited

U.S. PATENT DOCUMENTS

| | | | |
|---|---|---|---|
| 3,362,252 | 1/1968 | Ditlinger | 416/134 A |
| 3,370,483 | 2/1968 | Ditlinger | 416/134 A |
| 3,578,877 | 5/1971 | Mautz | 416/134 A |
| 3,640,643 | 2/1972 | Monti | 416/134 A |
| 4,163,630 | 8/1979 | Weiland | 416/134 A |
| 4,242,048 | 12/1980 | McArdle | 416/138 |
| 4,243,359 | 1/1981 | Schwarz et al. | 416/134 A |
| 4,299,538 | 11/1981 | Ferris et al. | 416/134 A |
| 4,299,539 | 11/1981 | Schwarz et al. | 416/134 A |
| 4,307,996 | 12/1981 | Watson | 416/141 |
| 4,915,585 | 4/1990 | Guimbal | 416/140 |

FOREIGN PATENT DOCUMENTS

| | | |
|---|---|---|
| 0089793 | 9/1983 | European Pat. Off. . |
| 1190259 | 11/1967 | France . |
| 1559400 | 3/1968 | France . |
| 2362754 | 3/1978 | France . |
| 2377324 | 8/1978 | France . |
| 2441541 | 6/1980 | France . |
| 2443382 | 7/1980 | France . |
| 752220 | 7/1956 | United Kingdom .............. 416/138 |
| 1019673 | 2/1966 | United Kingdom .............. 416/140 |
| 2036677 | 7/1980 | United Kingdom . |

OTHER PUBLICATIONS

Derwent Abstract of German Patent Application 2 638 148.
Derwent Abstract of German Patent Application 2 945 195.

*Primary Examiner*—Edward K. Look
*Assistant Examiner*—James A. Larson
*Attorney, Agent, or Firm*—Armstrong, Westerman, Hattori, McLeland & Naughton

[57] ABSTRACT

This invention relates to a rotorcraft rotor head which includes an even number of blades arranged in groups of two blades (2) which are diametrically opposed to each other, and linked to each other by a connection system without any link with the rotor hub. Each blade (2) is articulated in flapping and in pitch on the hub body (1) by a sleeve (3) which is arranged between the root of the blade (2) and the hub body (1). The sleeve (3) bears against the periphery of the hub body (1) by a laminated spherical stop (5) and includes an introduction member for controlling the pitch of the blade (2). Each system for connecting two diametrically opposed blades (2) is comprised of two tie rods (4) which link the two diametrically opposed sleeves (3) of the blades (2). The two tie rods (4) are arranged parallel to the plane of the rotor on either side of the longitudinal axis which is common to the two diametrically opposed blades (2). The two tie rods (4) are parallel and substantially spaced apart with respect to the common longitudinal axis. The member which fastens the two tie rod (4) to each sleeve (3) is arranged on the outside of the laminated spherical stop (5) of the sleeve (3) with respect to the rotor axis such that the length of the two tie rods (4) is significantly greater than the distance between the centers of the two diametrically opposed laminated spherical stops (5).

30 Claims, 6 Drawing Sheets

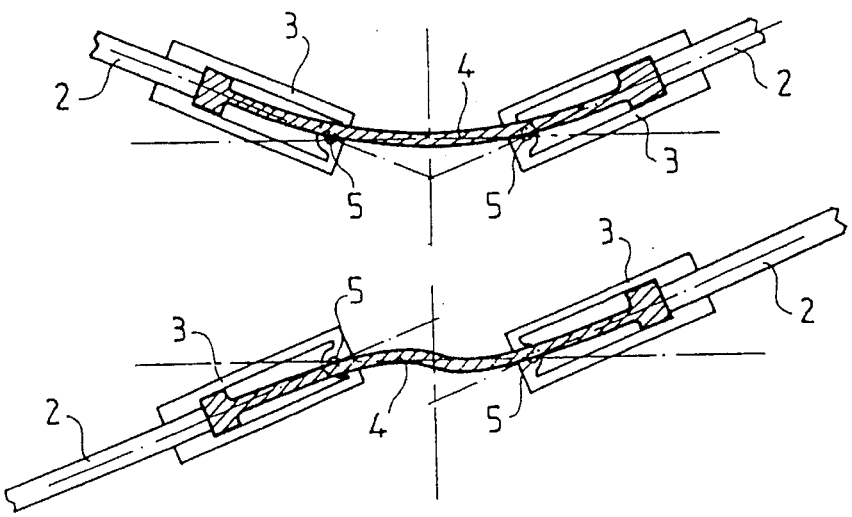
FIG. 11
FIG. 12
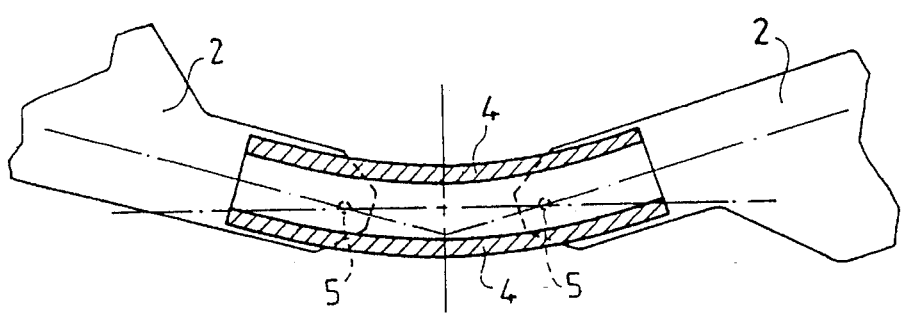
FIG. 13
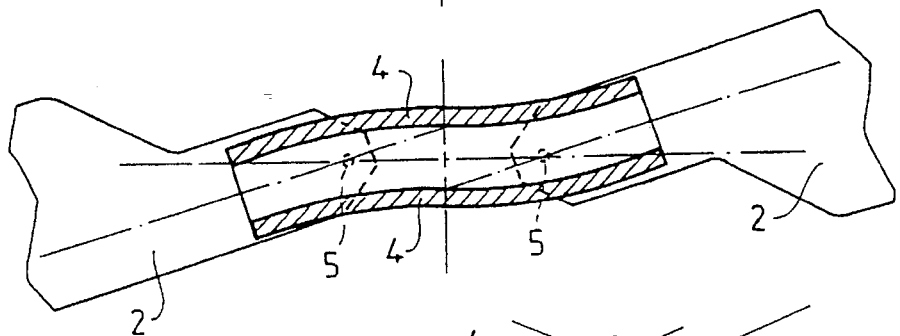
FIG. 14
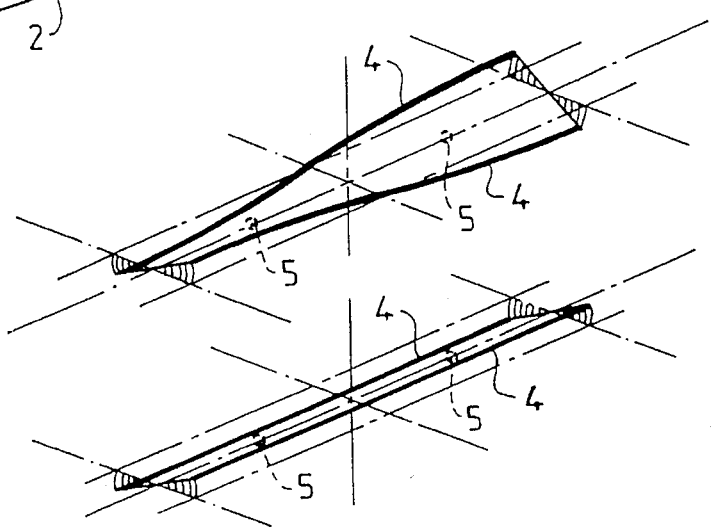
FIG. 15
FIG. 16

ROTORCRAFT ROTOR HEAD, WHICH IS RIGID IN DRAG AND ARTICULATED IN PITCH AND FLAPPING

This application is a continuation application Ser. No. 07/907,576 filed Jul. 2, 1992, now abandoned.

FIELD OF THE INVENTION

The present invention relates to rotorcraft rotor heads. More particularly it concerns rotor heads, of the type which are rigid in drag, which comprise an even number of blades, which can be applied especially to helicopter rotor heads, and more particularly to rear rotor heads of helicopters, providing the anti-torque function and the control of the apparatus in yaw in this type of rotorcraft.

In this novel rotorcraft rotor head according to the invention, each blade is, on the one hand, retained against a part of the centrifugal force, and on the other hand, articulated in flapping, drag and pitch on the perimeter of the central and rigid part of the hub body, by means of a single laminated spherical stop, whose internal reinforcement is integral with the internal end of an intermediary sleeve which links it with the foot of the blade, and which controls this blade in pitch. This laminated spherical stop comprises an alternate stacking which is in the shape of a portion of a sphere which is arranged between two reinforcements, one being rigidly linked to the hub, and the other being rigidly linked to the intermediary sleeve which links the foot of the blade to the hub body. The alternate stacking which is in the shape of a portion of a sphere is constituted by rigid cups and by strips made of an elastic material which in compression transmits part of the centrifugal forces from the blade to the hub body, and allows angular oscillations of the blade in flapping, in drag and in pitch.

Moreover, in the type of rotorcraft rotor head structure according to the invention, two diametrically opposed blades are retained on each other, and against part of the centrifugal force which is exerted on them, by a connection system constituted by two parallel tie rods arranged on either side of the longitudinal axis of a change in pitch which is common to the two blades and without any link with the hub body.

DESCRIPTION OF THE PRIOR ART

Examples of rotorcraft rotor heads having an even number of blades, and in which two diametrically opposed blades are connected to each other by a linking device, are described in French Patents Nos 2,443,382, 2,362,754, 2,377,324 and 2,441,541.

In French Patent No. 2,443,382, the two diametrically opposed blades are linked by a double strip which traverses the hub without being fixed thereon. Each blade comprises a pitch control sleeve, which bears on the hub by a swivel bearing in such a way as to permit, according to this document, total freedom of movement in torsion and in bending between the fixing connections of the opposite blades. Each of these swivel bearings, such as it is arranged in this patent, cannot in any way participate, even slightly, in the uptake of centrifugal forces. In this design, the major drawback consists in that, if for any reason the centrifugal force between two diametrically opposed blades is no longer the same, the swivel bearing is unable to accomodate the difference, and the system assembly thus becomes unstable and may lead to an explosion of the rotor.

In U.S. Pat. No. 2,362,754, the diametrically opposed blades of each pair of blades are connected together by two parallel tie rods made of composite material. These tie rods transmit the centrifugal force from one blade to the opposite blade without involving the hub body. Moreover in their torsion, these tie rods allow variations of pitch on the blades. At each of their ends, they are linked to the hub body by a bearing which allows angular movements of pitch, but which also allows flapping and drag movements. One of the two bearings moreover allows an axial movement of the tie rods with respect to the hub body. The other bearing, which cannot be moved axially, thus only transmits to the hub body the difference in centrifugal force between the two blades. This device thus concerns a hub which is rigid in drag, in which the angular drag movements are only allowed by the differential extension of the two tie rods. In this design, the centrifugal force passes integrally through the tie rods, because one of the two fixing bearings of a pair of blades on the hub body is free in the axial direction of the tie rods.

In U.S. Pat. No. 2,377,324, two diametrically opposed blades are linked by a tie rod which is in the shape of a flat bar, which is a construction element which is integral with the structure of each of these diametrically opposed blades. This tie rod device bears on the hub body in its external part via a bearing called "pitch angle bearing", which allows variations in pitch and flapping of the blades. These bearings may, or may not transmit, on demand, all or part of the centrifugal forces originating from the blade to the hub body. In the case where it is not necessary to transmit these forces via the bearings, it is sufficient to give these bearings a certain axial play. It is thus advisable to constitute, by means of the bar linking the blades, a central bearing surface in the hub in order, according to this document, to return to axial stability in the event of unbalance and vibrations. It should be noted that the linking system between the blades consists only of a flat bar, and that consequently, the device is not very rigid in drag, all the more so since the bar is flat in the plane perpendicular to the plane of the rotor. It seems to be difficult therefore, with such a hub system, to have a natural frequency of drag of the rotating blade which is suitable with respect to the rotational speed. Moreover, the joining bar is flat and of integral construction with the blades, which poses problems of manufacture of this assembly and leads to considerable maintenance difficulties when the blades need to be changed. Finally, if the position of the part of the bar linking the two blades which is flexible in flapping with respect to the axis of flapping of the blade is examined, this axis of flapping being defined as the axis which is perpendicular to the longitudinal axis of the blade, situated in the plane of rotation of the rotor and passing through the center of articulation of flapping, it can be seen that, in line with the swivel which acts as the center of articulation in flapping, the bar which is flexible in flapping is practically embedded into the root of the blade, so that the dynamic bending stresses in flapping in the bar are at a maximum in line with this embedded part and are thus situated at a very high level.

In U.S. Pat. No. 2,441,541, the opposite blades of each pair are linked together by an elongate linking member, which can be twisted but which is rigid along its longitudinal axis and which is articulated in flapping at each of its ends. This member traverses the hub body without being fixed thereon. Moreover, two substantially parallel strips arranged on either side of the linking member link the blades to the hub. These flat strips are flexible in torsion and in flapping bending. Their rigidity in traction is less than that of the central linking member. This rotor which does not comprise an articulation, has strips which are flexible in flapping and twistable in pitch which are fixed to the hub body. They thus transmit to the hub the transverse forces of flapping and of drag. Moreover, the rigidity in traction is split between the strips and the linking member, so that the greater part of the centrifugal forces is transmitted from one blade to the other via this central linking member, because the modulus of this member is greater than that of the strips.

GENERAL DESCRIPTION OF THE INVENTION

The object of the present invention is to overcome the various drawbacks described above, and to provide a rotorcraft rotor head architecture which has an even number of blades, which are arranged in groups of two blades which are diametrically opposed to each other, and linked to each other by a connection system without any link with the rotor hub, in such a way that this connection system transmits only part of the centrifugal forces originating from each blade to the diametrically opposite blade.

According to the invention, each blade is articulated in flapping and in pitch on the hub body by means of a sleeve. This sleeve is arranged between the root of the blade and the hub body, and it bears on the periphery of this hub body by means of a laminated spherical stop.

Each system for connecting two diametrically opposed blades is constituted by two tie rods which link the two diametrically opposed sleeves of these blades. The two tie rods are arranged in a plane which is parallel to the plane of the rotor on either side of the longitudinal axis which is common to two diametrically opposed blades. These two tie rods are parallel and substantially spaced with respect to the common longitudinal axis. Moreover, the member fastening each of these two tie rods to each sleeve is arranged on the outside of the laminated spherical stop of this sleeve, and in such a way that the length of the two tie rods is significantly greater than the distance between the centers of the two diametrically opposed laminated spherical stops.

Advantageously, the two tie rods are dimensioned in cross-section in order to be flexible in bending and in torsion in order to follow the movements of each blade in flapping and in pitch, but are relatively rigid in traction in order, on the one hand, to transmit to the opposite blade a fraction of the centrifugal force being exerted on each blade foot and, on the other hand, to oppose the angular oscillations of the blade in drag, that is to say in the plane of the rotor and consequently to give, to the rotating blade, a first natural mode of drag which is distinctly higher than the corresponding frequency at the nominal rotational speed of the rotor. Moreover, the relative rigidities of the tie rods in traction and of the laminated spherical stops in compression are determined in a pre-established ratio in such a way that the centrifugal force originating from each rotating blade may be balanced out by being split, in proportion to these rigidities, between a part which is transmitted to the diametrically opposite blade by the tie rods and a part which is transmitted to the hub body by the corresponding laminated spherical stop.

Thus, the particular structure of the invention, which allows the transmission of forces due to the centrifugal forces of one blade to be split between the diametrically opposite blade and the hub body, allows the structural elements of the rotor head and in particular the laminated spherical stops to be relieved accordingly.

In this configuration of the connection system, the two tie rods have, at each of their ends, a fastening member, which is linked to the corresponding sleeve by a fixing means whose axis is substantially parallel to the rotor axis, a means constituted by a bolt which links the sleeve to the fastening member of the tie rod.

In a first embodiment of the invention, each of the tie rods is constituted by a bundle of stacked thin metallic strips, strips whose ends are shaped into an eyelet in order to receive the bolts for linking onto the sleeves. In this configuration of the tie rods, the thin metallic strips situated on the outside of the bundle are of a smaller width than that of the internal strips, in such a way as to distribute between them the shear stresses due to their torsion. Moreover, in order to avoid contact corrosion between the strips, the latter are covered in an antifriction plastic coating.

In a second embodiment of the invention, each of the tie rods is constituted by a skein winding of metal wires of high mechanical strength, sheathed in a flexible material. The wires are, for example, made of steel and the flexible sheathing material is made of elastomer.

Preferentially, each of the tie rods has a cross section of ellipsoidal shape, and in order to take best advantage of this structure, each of these tie rods is made of a filamentary composite material constituted by filaments of high mechanical strength arranged parallel along the longitudinal axis of the tie rod and agglomerated by a resin. The composite material can be constituted by a winding of mineral or synthetic fibers of high mechanical strength, agglomerated by a synthetic resin which is polymerized by heat. According to a preferred composition of the material, the winding fibers of high mechanical strength are of the aramid type and the resin is of the epoxy type, but they can also be of glass.

Advantageously and on the basis of the composition of the tie rods described above, the two fastening members of each of the tie rods are constituted by a cylindrical bush around which the corresponding end of the tie rods is wound. More precisely, each of the tie rods is obtained by skein winding, on a form bush, arranged at each of their ends, so as to constitute the corresponding fastening member. The tie rod is next polymerized by heat and under tension in a shaped mold.

In a preferred structure of the invention, the ends of two neighboring tie rods which are linked to the same sleeve are integral with each other by being arranged in a laminated structure. Each of the laminated structures comprises a shell made of high-strength fiber fabrics which are sheathed in a synthetic resin and a filling of compound. The whole assembly is then polymerized by heat under pressure.

Each of the connection systems, according to the invention, thus has the advantage of constituting a complete subassembly on which each of the sleeves caps the two ends of the corresponding tie rods which are integral with the laminated structure, and the fastening members of which are fixed in this sleeve by the two bolts which pass through bores made in the two bushes of their ends.

In order to best fulfil its function, each of the laminated spherical stops comprises a central part which can be deformed by rotation about the common center of the spherical cups of which it is made up, and which central part is integral, on the one hand, with an internal reinforcement and, on the other hand, to an external reinforcement. The external reinforcement is linked to the hub body, whilst the internal reinforcement is integral in motion with the foot of the corresponding blade by means of its sleeve with which this internal reinforcement is integral by fixing means, whose axis is substantially parallel to the rotor axis, and which are constituted by bolts. Equally, the external reinforcement of each of the laminated spherical stops is linked to the hub body by means of fixings, whose axis is substantially parallel to the rotor axis, and which are constituted by two bolts which pass through bores made in the external reinforcement.

In a preferred structure of the invention, the internal reinforcement of each of the laminated spherical stops is mounted in a linking brace which is integral with the corresponding sleeve by means of two fixing bolts, which pass through the bores made in this linking brace. More precisely, the internal reinforcement of each of the laminated spherical stops comprises an axial cylindrical housing which receives a corresponding cylindrical tenon made on the linking brace, the axis of the axial cylindrical housing and of the tenon being substantially parallel to the longitudinal axis of the sleeve and of the corresponding blade.

According to the invention, each sleeve is constituted by an elongated tubular body of oval cross section, whose longitudinal axis is substantially that of the corresponding blade, and of which the end toward the outside with respect to the rotor axis is closed by a thin stiffening transverse wall. This body with an oval cross section comprises a recess on its internal and external faces with respect to the uptake of movement, recesses which are situated opposite each other for the passage of the external reinforcement of the laminated spherical stop.

In addition, each sleeve comprises, at its inner end, turned toward the axis of the rotor, a double clevis between the branches of which the linking brace is fixed.

Each sleeve also comprises, at its outer end, beyond the thin transverse stiffening wall, a double clevis in which the foot of the corresponding blade is fixed.

Each sleeve also comprises, in its intermediate central part and near to the thin transverse stiffening wall, two bores having axes substantially parallel to the rotor axis and designed to receive the bolts for fixing the fastening members of the tie rods.

Finally, each sleeve comprises, on one of its longitudinal walls, two lugs arranged face to face and perpendicular to said wail, in such a manner as to constitute a clevis to receive the articulated fastening member of the corresponding blade pitch control connecting rod.

The structure of each of the sleeves, according to the invention, as well as the presence of a linking brace which cooperates with the internal reinforcement of the laminated spherical stop, offer the advantage of allowing the replacement of a laminated spherical stop without completely dismantling the assembly. In fact, the possible replacement of one of these stops can be carried out by dismantling the two fixing bolts from its external reinforcement and by laterally disengaging the internal reinforcement from where it is embedded into the linking brace of the sleeve, in order to allow it to be passed through the recess made in the external wall of the sleeve with respect to the uptake of movement.

According to one embodiment of the invention, the hub body is a hollow cylinder which is arranged at the end of the rotor shaft and in which are housed the articulation means which are constituted by the laminated spherical stops. This hub body comprises diametrically opposed radial openings which are equal in number to the number of blades. This hub body is produced in two parts: one internal part and one external part, the internal part being connected to the rotor shaft, and the external part being in the shape of a cover which is integral with the internal part.

More precisely, the cover is fixed to the internal part:

by means of bolts which are arranged in bores made on the portions of flanges situated on the perimeter of the internal part and of the cover in the shape of a crown, and by means of bolts which are arranged in bores drilled in the external reinforcements of the laminated spherical stops, and in bores made on the flange elements situated on the perimeter of the internal part and of the cover, near to the central zone of the recesses of the sleeves, in such a way as to coincide with the bores made on the external reinforcements. Each of these external reinforcements of the laminated spherical stops is respectively fitted into the internal part and the cover in the transverse direction which is perpendicular to the axis of the blade.

Advantageously, the internal part of the hub body is directly connected to the rotor shaft by a footing. This footing has a flared part of frustoconical shape, the wall of which has its small base on the rotor shaft side, so as to constitute an integral assembly. The internal part is constituted by a wall, which has a substantially frustoconical general shape, and the perimeter of the large base of which is constituted by the portions of flange arranged between the radial openings for the passage of the sleeves and the small base of which is linked to the footing. The cover is also constituted by a wall which has a substantially frustoconical general shape, the perimeter of the large base of which is constituted by the portions of flange corresponding to those of the hub body and the small base of which is closed by a bottom which is substantially flat and parallel to the plane of the rotor. The radial openings provided for the passage of the sleeves are arranged, along the rotor axis, in groups of two radial openings which are diametrically opposed with a slight offset along the rotor axis between the groups of tie rods, which allows the free deflection of these tie rods during their bending in order to follow the flapping and the setting of the pitch of the blades and to avoid any interference therewith.

The rotorcraft rotor head, according to the invention, thus offers the particularity of having an assembly which allows the forces due to centrifugal force on the blades to be distributed between the laminated spherical stops and the inter-blade tie rods. Moreover, this assembly offers the advantage of having an advantageous structure in order to facilitate the mounting and dismantling of the laminated spherical stops which, by virtue of their particular architecture which is combined with the original architecture of the corresponding sleeve, can be easily replaced without having to completely dismantle the rotorcraft rotor head.

BRIEF DESCRIPTION OF THE DRAWINGS

Other advantages will emerge from the invention which will be better understood, with the aid of the description given below of a particular embodiment of a four-bladed rear helicopter rotor described by way of a non limiting example, with reference to the appended drawings, in which:

FIG. 11 is a diagrammatic view of the assembly of a connection system with the two sleeves and the two corresponding blades in axial cross-section along the rotor axis during a symmetric flapping of the blades;

FIG. 12 is a view similar to FIG. 11 for an antisymmetric flapping of the two diametrically opposed blades;

FIG. 13 is a diagrammatic view in cross-section along the rotor plane of the assembly of a connection system with the sleeves and the blades during symmetrical drag;

FIG. 14 is a view similar to FIG. 13 for an antisymmetric drag of the two diametrically opposed blades;

FIG. 15 is a diagrammatic view in perspective of the connection system of two diametrically opposed blades during a general pitch control;

FIG. 16 is a view similar to FIG. 15 of a connection system between two diametrically opposed blades during a cyclic pitch and due to the antisymmetric flapping.

DESCRIPTION OF PREFERRED EMBODIMENTS

Figure 1:
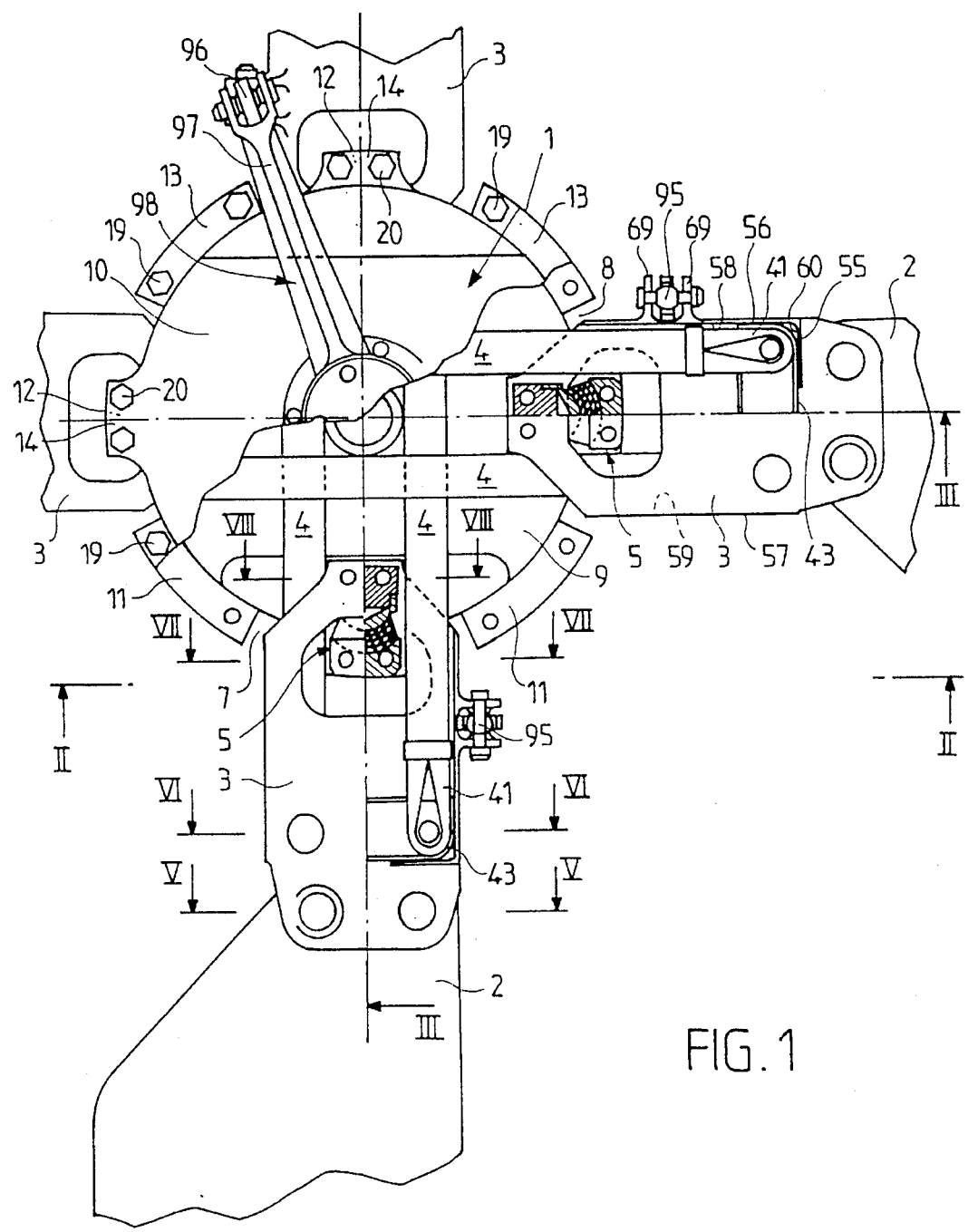
FIG. 1 is a view along the plane of the rotor of the four-bladed rear helicopter rotor according to the invention, the cover being partly cut away to show the two connection systems which are perpendicular to each other, the two sleeves being in part section along the plane of the rotor, and for the sleeve shown on the lower part of the drawing, a partial cutaway of the external half-view of the sleeve in order to show the details of the laminated spherical stop.
Figure 2:
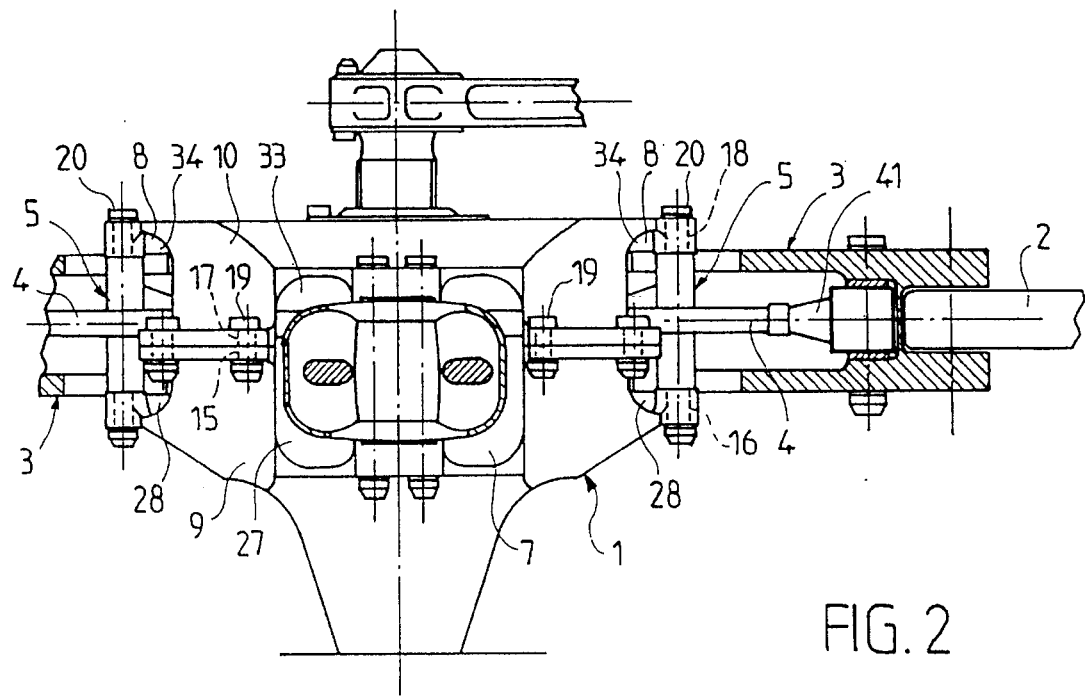
FIG. 2 is a cross-section along the plane II—II of FIG. 1, the walls of the sleeves being in partial cross-section in order to show the link between the tie rods and each of these sleeves.
Figure 3:
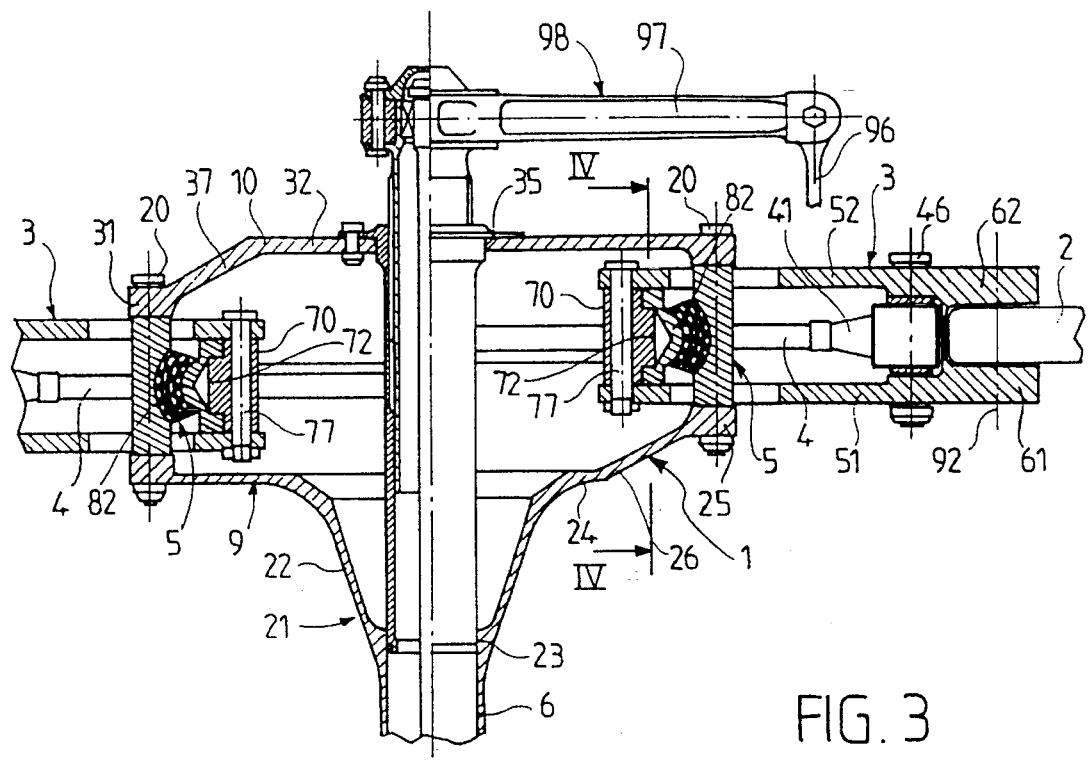
FIG. 3 is an axial cross-section along the plane III—III, the sleeves being in partial cross-section.

The assembly of a helicopter rear rotor head according to the invention, is represented in FIGS. 1, 2 and 3. As can be seen in FIG. 1, the rotor head comprises an even number of blades 2, which are arranged in groups of two blades 2 situated in a diametrically opposed manner with respect to each other, relative to the rotor axis. A connection system links each blade 2 to the diametrically opposed blade 2, and this connection system is arranged in such a way as to have no link with the rotor hub.

Each blade 2 is linked to the hub body 1 by means of a sleeve 3. Each of the sleeves 3 is arranged between the root of the blade 2 and the hub body 1, and it bears on the periphery of this hub body 1 via a stop which also forms an articulation in flapping and pitch which is constituted by laminated spherical stop 5. Each of the two connection systems for two diametrically opposed blades 2 links the two sleeves 3 of the corresponding blades 2, that is to say the two sleeves 3 which are also diametrically opposed.

Each of the two connection systems is relatively rigid in drag and it comprises two tie rods 4. These two tie rods 4 are arranged in a plane parallel to the plane of the rotor on either side of the longitudinal axis which is common to the two blades 2 which are diametrically opposed, and which this connection system inks. Moreover, these two tie rods 4 are parallel to each other, and they are substantially spaced with respect to the common longitudinal axis of the two blades, with which these two tie rods 4 are also parallel. According to an essential characteristic of the invention, the member 41 fastening each of the two tie rods 4 to each of the two sleeves 3 which are diametrically opposed, is arranged on the outside of the laminated spherical stop 5 of this sleeve 3 with respect to the rotor axis. The general arrangement of the connection system for the two corresponding sleeves 3 and the two laminated spherical stops 5 is such that the length of each of the two tie rods 4 between its fastening members 41 is substantially greater than the distance which exists between the centers of the two corresponding laminated spherical stops 5 which are diametrically opposed.

In order to take full advantage of the structure of these connection systems which belongs to the invention, the two tie rods 4 which constitute each of these connection systems, are dimensioned in cross-section in such a way as to be flexible in bending in the plane perpendicular to the plane of the rotor and flexible in torsion along their own longitudinal axis, and finally to be hardly deformable in traction. In order to distribute the centrifugal forces between the different components of the rotor head according to the invention, the laminated spherical stops 5 of each of the two diametrically opposed sleeves 3 have relative rigidity in compression and the two tie rods 4 linking these two sleeves 3 have relative rigidity in traction, such that the centrifugal forces originating from each blade 2 are transmitted to the diametrically opposite blade 2 and to the hub body 1 in proportion to these rigidities. Thus, the particular structure of the invention makes it possible to carry part of the forces due to the centrifugal forces from one blade 2 across to the other diametrically opposite blade 2, which relieves the compressive load on the laminated spherical articulation stops accordingly.

In the embodiment shown in the figures, the control is performed by a spider, that is to say that each end of an arm 97 of the control plate 98 which can move axially comes onto a clevis, which is arranged on one of the sides of the sleeve 3 by means of a swivel-ended connecting rod 96, whose fastening member 95 is mounted into this clevis.

As can be seen in FIGS. 1, 2 and 3, the hub body 1 is a hollow cylinder which is arranged at the end of the rotor shaft 6, and in which are housed the articulation means constituted by the laminated spherical stops 5. The hub body 1 is in two parts: an internal part 9 and an external part in the form of a cover 10. The internal part 9 is connected to the rotor shaft 6, and the cover 10 is integral with the internal part 9. The hub body 1, corresponding to the embodiment of the invention represented in the figures, comprises four radial openings: two internal radial openings 7 and two external radial openings 8. The internal radial openings 7 are relatively closer to the rotor shaft 6 than the external radial openings 8. Moreover, the internal radial openings are diametrically opposed and in a direction which is perpendicular to the external radial openings, which are also diametrically opposed. These internal 7 and external 8 radial openings are intended to allow the sleeves 3 together with their connection systems constituted by the tie rods 4 to pass through.

The cover 10 is integral with the internal part 9 by means of flange portions 11 which are situated on the perimeter of the internal part 9, and by means of flange portions 13 which are also situated on the perimeter of the cover 10. These perimeters are each in the shape of a circular crown and the flange portions 11 and 13 bear respectively against each other between the internal radial openings 7 and the external radial openings 8. The flange portions 11 and 13 are fixed against each other by means of bolts 19, which are arranged in bores 15 made in the flange portions 11, and in bores 17 made in the flange portions 13. Moreover, the cover 10 is integral with the internal part 9 by bolts 20 which provide the fixing of the laminated spherical stops 5. These bolts 20 are arranged in bores 16 which are made in the flange elements 12 situated on the perimeter of the internal part 9 and in the bores 18 made in the flange elements 14 situated on the perimeter of the cover 10. These flange elements 12 and 14 are arranged close to the central zone of the sleeves 3, in such a way as to be able to coincide with the laminated spherical stops 5.

As can be seen in FIGS. 1, 2 and 3, each sleeve 3 is constituted by an elongated tubular body of oval cross-section, whose longitudinal axis is substantially that of the corresponding blade. This body comprises an internal wall 51 and an external wall 52, with respect to the uptake of movement, and two longitudinal walls 56 and 57, situated in a plane which is perpendicular to the plane of the rotor, and of which the outer end is closed by a thin stiffening transverse wall 55, and which comprises in its internal 51 and external 52 walls, with respect to the uptake of movement, two recesses 53, 54 situated opposite each other for the passage of the laminated spherical stop 5.

Said tubular body comprises moreover;

- at its inner end, a double clevis between the branches 73, 74 of which the linking brace 70 is fixed, by means of the two fixing bolts 77 which pass through, on the one hand, the bores 72 made in the linking brace 70 and, on the other hand, the bores 67, 68 made in the branches 73, 74 of said double clevis;
- at its outer end, beyond the thin stiffening wall 55, a double clevis in which the foot of the corresponding blade 2 is mounted, two bores 63, 64 being made in each of the branches 61 and 62 which are opposite and substantially parallel to the rotor axis, in such a way as to receive the two spindles 92 for attaching the blade;
- in its central intermediate part and close to the thin stiffening transverse wall 55, bores 65.66 having axes which are substantially parallel to the rotor axis and intended to receive the two bolts 46 for fixing the fastening members 41 of the tie rods 4.

Two Lugs 69 are arranged face to face and perpendicular to one of the longitudinal walls 56 of the sleeve 3, which they are integral with, in such a way as to constitute a clevis to receive the corresponding pitch control fastening member 95. Thus, each of the sleeves 3 receives tile pitch control movement, and provides the link between the corresponding blade 2 and the hub body 1 by means of the corresponding laminated spherical stop 5.

Each of the connection systems comprises two tie rods 4 each of the ends of which is constituted by a fastening member 41, which is connected to the corresponding sleeve 3 by means of fixing bolts 46. The ends of two neighboring tie rods 4 linked to the same sleeve are integral with each other and arranged in a aminated structure 43. This laminated structure 43 is mounted inside the housing of the corresponding sleeve 3 which is constituted by the internal face 58 of the longitudinal wall 56, by the internal face 59 of the longitudinal wall 57, and by the internal face 60 of the transverse wall 55. Each of the sleeves 3 thus caps the two ends of the corresponding tie rods 4 which are integral with the laminated structure 43, and the fastening members 41 of which are fixed into this sleeve 3 by the two fixing bolts 46. The two tie rods 4 of each of the connection systems are distant from each other, so as to leave a passage which is sufficient for the mounting of the two laminated spherical stops 5 with their linking brace 70.

Figure 4:
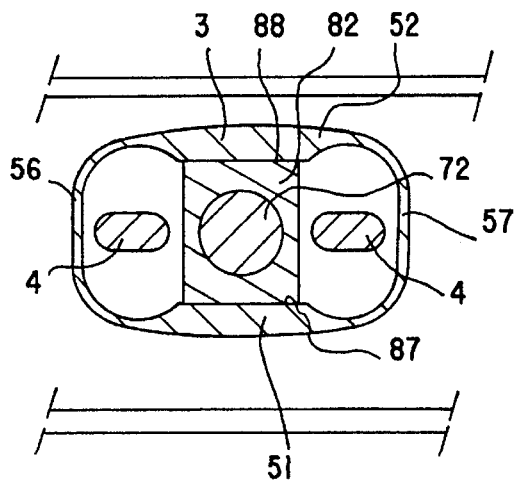
FIG. 4 is a view along the plane IV—IV of FIG. 3.

Each of the laminated spherical stops 5 is connected, on the one hand to the hub body 1 of which it partly provides the fixing of the cover 10 to the internal part 9, and it is connected, on the other hand, to the corresponding sleeve 3 by means of the linking brace 70, which fixes the internal end of each of the internal 51 and external 52 walls of the corresponding sleeve 3. In this way, each of the laminated spherical stops 5 is arranged at the periphery of the hub body 1, and provides the linking of this hub body 1 with each of the corresponding sleeves 3. As can be seen in FIG. 4, the linking brace 70 is arranged between each of the two tie rods 4, which are sufficiently spaced from each other. These two tie rods 4 are mounted inside the longitudinal walls 56 and 57 of the sleeve 3.

Figure 5:
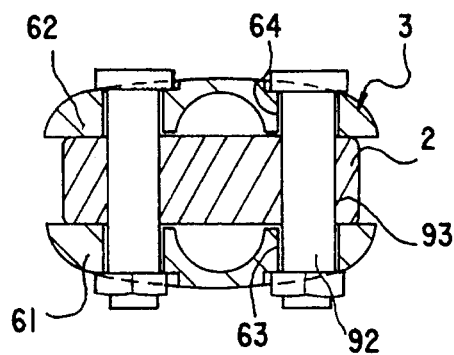
FIG. 5 is a view along the plane V—V of FIG. 1.

FIG. 5 shows in cross-section the detail of the link between each of the sleeves 3 and the corresponding blade 2. Each of the blades 2 is linked to the corresponding sleeve 3 by fixing means whose axis is substantially parallel to the rotor axis. These fixing means are the spindles 92, which pass through bores 63 and 64 made in a double clevis of the sleeve 3. These bores 63 and 64 are aligned with each other, and correspond to a bore 93, which is made in the foot of the corresponding blade 2.

Figure 6:
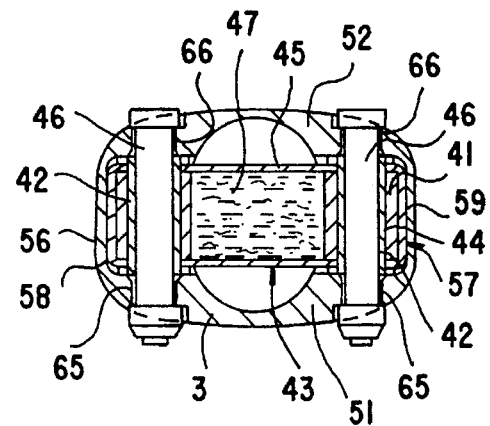
FIG. 6 is a view along the plane VI—VI of FIG. 1.

FIG. 6 is a cross-section which shows the detail of the link between each of the sleeves 3 and the end of the two corresponding tie rods 4. The fastening member 41 of each of the neighboring ends of the two tie rods 4 of the connection system is linked to the corresponding sleeve 3 by a fixing means, whose axis is substantially parallel to the rotor axis. This fixing means is constituted by the bolt 46 which links the sleeve 3 to the fastening member 41 of the corresponding tie rod 4. The two fastening members 41 of each of the two tie rods 4 are constituted by a cylindrical bush 42 around which is wound the corresponding end of the tie rod 4. Thus, each of the sleeves 3 caps the two ends of the corresponding tie rods 4, which are integral with the laminated structure 43. The fastening members 41 are fixed into this sleeve 3 by the two bolts 46 which pass through bores 44 made in the two bushes 42 at their ends. The bolts 46 for fixing the fastening members 41 of the tie rods 4 pass through bores 65 made in the internal wall 51, and bores 66 made in the external wall 52. Each of the bores 65 is arranged opposite a bore 66, in such a way as to constitute an axis which is substantially parallel to the rotor axis and along which the corresponding fixing bolt 46 which passes through the bore 44 of the bush 42 of the fastening member 41 of the tie rod 4 is mounted.

Figure 7:
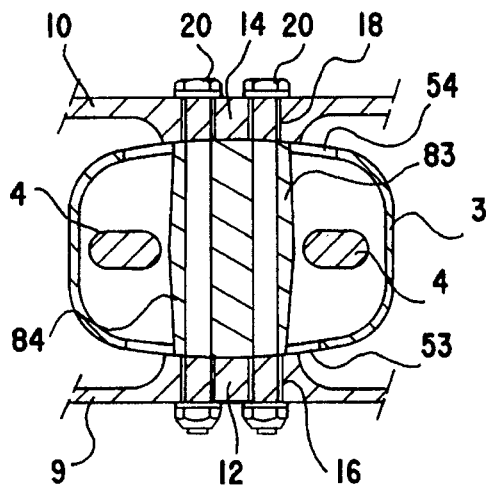
FIG. 7 is a view along the plane VII—VII of FIG. 1.

FIG. 7 shows, in cross-section, the detail of the link between each of the laminated spherical stops 5 and the hub body 1. This link is constituted by fixing means whose axis is substantially parallel to the rotor axis, and which consist of two bolts 20 which pass through bores 84 made in the external reinforcement 83 of each of the laminated spherical stops 5. Each of the two bolts 20 thus pass through the bores 84 drilled in the external reinforcement 83 of the laminated spherical stop 5, and also pass through the bores 16 and 18 made respectively in the internal part 9 and the cover 10 of the hub body 1. More precisely, the bores 16 are made in the flange elements 12 situated on the perimeter of the internal part 9 and the bores 18 are made in the flange elements 14 situated on the perimeter of the cover 10. These flange elements 12 and 14 are situated close to the central zone of the sleeves 3, that is to say in the proximity of the recesses 53 and 54 of the internal 51 and external 52 walls of the sleeve 3, in such a way that the bores 16 and 18 coincide with the bores 84 of the external reinforcement 83 of the corresponding laminated spherical stop 5. Thus, each of the laminated spherical stops 5 is integral with this hub body 1 by fixing bolts 20 which pass through the bores 16 made in the internal part 9 which also pass through the bores 18 made in the cover 10 and which finally pass through the bores 84 made in the external reinforcement 83 of each of the laminated spherical stops 5.

Figure 8A:
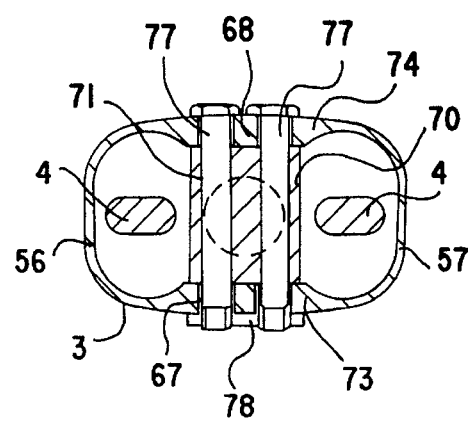
FIG. 8 is a view along the plane VIII—VIII of FIG. 1.
FIG. 8B is a view similar to that of FIG. 8A, and showing stacked metallic strips.
Figure 8B:
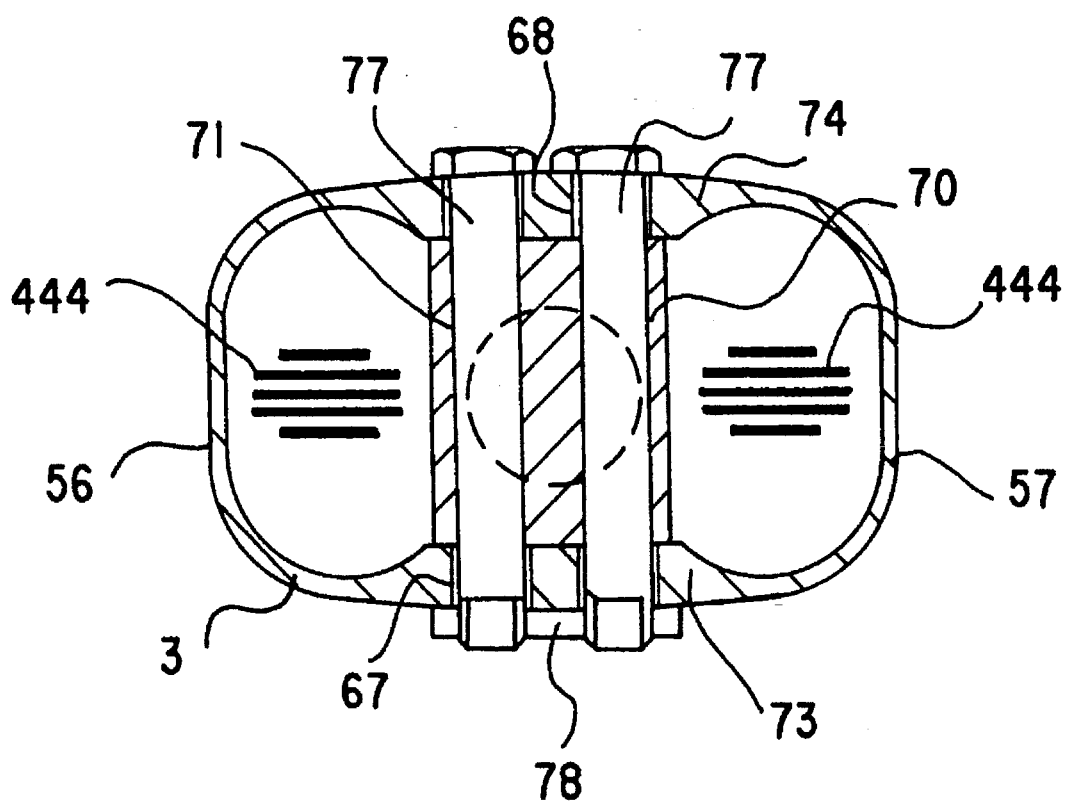

FIG. 8A shows, in cross-section, the detail of the link between each of the sleeves 3 and the linking brace 70 of the corresponding laminated spherical stop 5. Each of the sleeves 3 is integral with the corresponding linking brace 70 by fixing means whose axis is substantially parallel to the rotor axis, and which are constituted by two bolts 77. Bores 67 are made in the internal wall 51 of the sleeve 3, and bores 68 are made in the external wall 52. Each of the bores 67 is arranged opposite one of the bores 68, so as to constitute an axis which is substantially parallel to the rotor axis. Thus, each of the fixing bolts 77 passes through bores 67 and 68 made in the sleeve 3, and passes through the bore 71 made in the corresponding inking brace 70. The two fixing bolts 77 lock into a plate 78. FIG. 8B shows, in cross-section, the detail of the link (as in FIG. 8A) with the tie rod 444 illustrated as a bundle of stacked metallic strips with the outside strips having a smaller width than the internal strips.

FIGS. 1, 2, 3 and 7 allow the various details of the structure of the overall hub body 1 to be seen. As has been described previously, the hub body 1 comprises four radial openings 7 and 8 designed to provide the passage of the sleeves 3. These radial openings 7 and 8 are arranged in groups of two which are diametrically opposed to each other relative to the rotor axis and which constitute a group of internal radial openings 7 and a group of external radial openings 8. The group of external radial openings 8 is arranged in the hub body 1, in such a way that it is relatively further away from the rotor shaft 6 than the group of internal radial openings 7. This offset arrangement along the rotor axis makes it possible to avoid any interference between the two groups of tie rods 4 constituting the connection systems, which are perpendicular to each other, and it thus allows the free deflection of the various tie rods 4 during their bending in order to follow the flapping and the setting of the pitch of the blades 2.

The hub body 1 comprises two parts: the internal part 9 and the external part in the form of a cover 10 which is integral with the internal part 9.

The internal part 9 of the hub body 1 is connected to the end of the rotor shaft 6 by a footing 21. This footing 21 is constituted by a flared part of frustoconical shape with a wall 22 having its small base 23 on the side of the rotor shaft 6, so that the footing 21 and the rotor shaft 6 constitute an integral assembly. The internal part 9 itself has a generally substantially frustoconical shape which is constituted by a wall 26, and the small base 24 of which extends the footing 21. This wall 26 ends on the outer side with a large base 25 which is equipped at its perimeter with the four flange portions 11 and the four flange elements 12 arranged at its periphery.

The cover 10 has a generally substantially frustoconical shape which is constituted by a wall 37, and the large base 31 of which is equipped at its perimeter with four flange portions 13 and four flange elements 14 arranged at its periphery. This wall 37 is extended on the outer side by a small base 32 which is closed by a bottom which is substantially flat and parallel to the plane of the rotor. The small base 32 of this cover 10 is equipped with a central opening 35 which allows the mounting and passage of the device for driving the movable control plate 98. This movable control plate 98 is equipped with arms 97 which carry at their ends, swivel-ended connecting rods 96, whose pitch control fastening member 95 is connected to the corresponding sleeve 3.

Each of the internal radial openings 7 is constituted by an internal radial half-opening 27 made in the internal part 9, and by an internal radial half-opening 33 made in the cover 10. In the same way, each external radial opening 8 is constituted by an external radial half-opening 28 made in the internal part 9, and by an external radial half-opening 34 made in the cover 10. The laminated spherical stop 5 is locked by the two fixing bolts 20 which pass through the bores 18 of thecover 10, then through the bores 84 of the external reinforcement 83, and finally through the bores 16 of the internal part 9.

Figure 9:
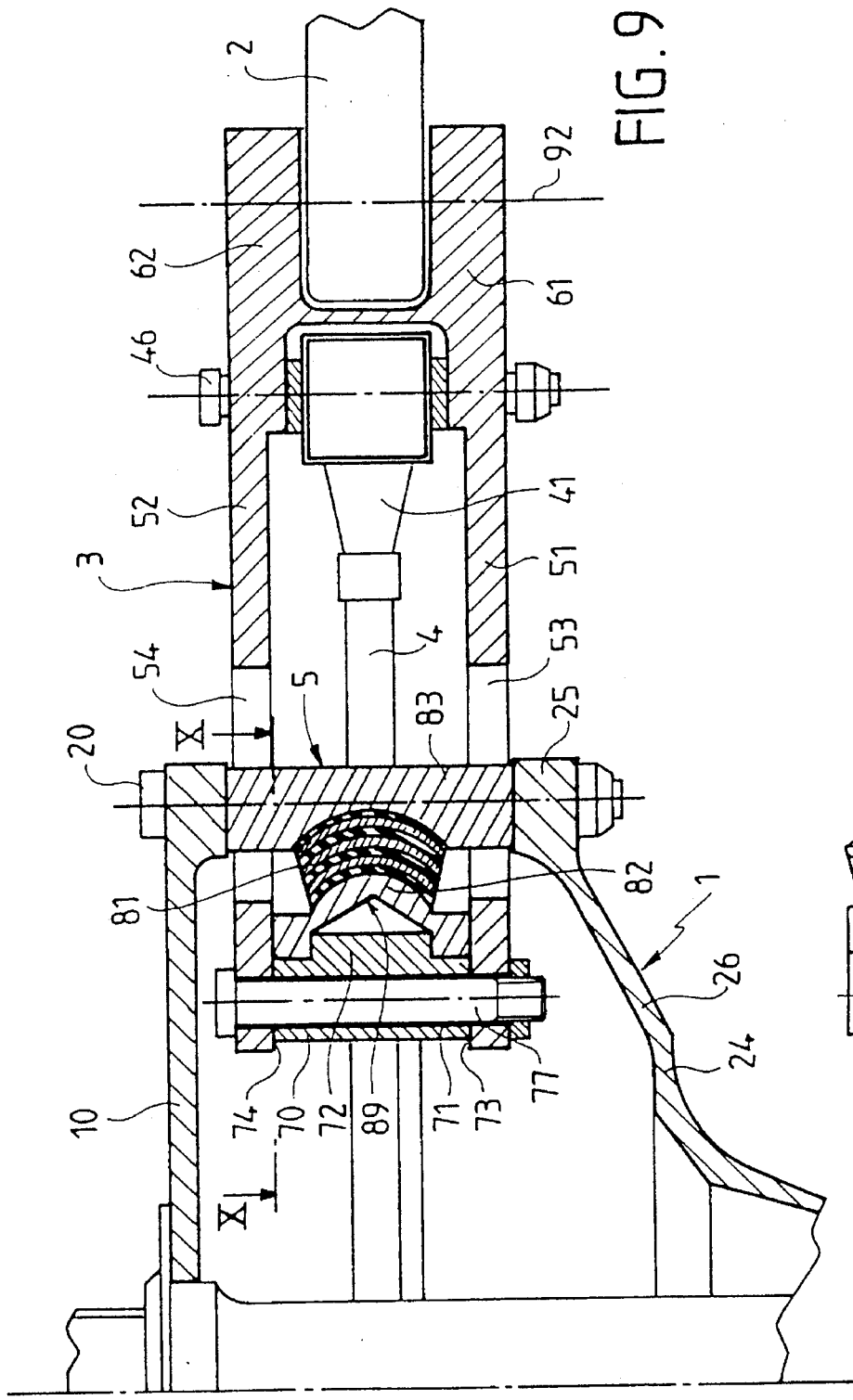
FIG. 9 is a cross-section on a large scale of the ink between the laminated spherical stop and the sleeve shown in FIG. 3.
Figure 10:
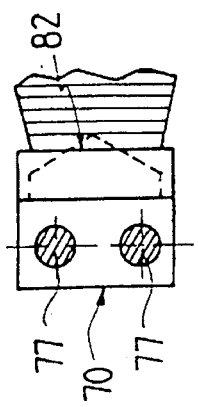
FIG. 10 is a view along the plane X—X of FIG. 9.

The various details of each of the sleeves 3 are represented more particularly in FIGS. 1, 9 and 10, as well as by the various cross-sections represented in FIGS. 4 to 8. As has been described previously, each of the sleeves 3 is constituted by an elongated tubular body of oval cross-section, whose longitudinal axis is substantially that of the corresponding blade 2, and whose external end, with respect to the rotor axis, is closed by a thin stiffening transverse wall 55, which comprises in its internal 51 and external 52 walls, with respect to the uptake of movement, two recesses 53, 54 situated opposite for the passage of the laminated spherical stop 5.

Each laminated spherical stop 5 which constitutes the single articulation member of the blade 2 on the hub body 1 is of a well known type, and it comprises a central part 81, which can be deformed in torsion, which is associated to an internal reinforcement 82 and to an external reinforcement 83. The central part 81 is constituted by an alternate stacking of rigid layers, which are generally metallic, and of elastomer layers in the shape of a spherical cap. This central part 81 is bonded, on the one hand, in the internal radial position onto the convex face of the spherical cap of the external reinforcement 83, and on the other hand, in the external radial position on the concave face of the spherical cap of the internal reinforcement 82 of the laminated spherical stop 5. The internal reinforcement 82 is integral with the internal end of the corresponding sleeve 3, whilst the external reinforcement 83 is linked to the periphery of the hub body 1 of the helicopter rotor head, as can be seen in FIGS. 9 and 7.

The detail of the structure of the linking brace 70 with the corresponding laminated spherical stop 5, and its link with the sleeve 3 are shown in FIGS. 8, 9 and 10. Each of the laminated spherical stops 5 comprises an axial cylindrical housing 89 which is made in the internal reinforcement 82. This cylindrical housing 89 receives a corresponding cylindrical tenon 72, which is made oil the linking brace 70. The axis of the axial cylindrical housing 89 and the axis of the cylindrical tenon 72 are substantially parallel to the longitudinal axis of the sleeve 3 and of the corresponding blade 2, as can be seen in FIG. 9. The linking brace 70 is integral with the sleeve 3 by fixing bolts 77 which pass through bores 68 and 67 made respectively in the external 52 and internal 51 walls, and they engage into the bores 71 made in the linking brace 70. The laminated spherical stop 5 which is thus integral via its linking brace 70 with the sleeve 3, is also integral by means of its external reinforcement 83 with the hub body 1. As can be seen in FIG. 7, the fixing bolts 20 engage in the bores 18 made in the flange element 14 of the cover 10, then they pass through the bores 84 of the external reinforcement 83 and finally they engage in the bores 16 made in the flange elements 12 of the internal part 9.

The detail of the structure of each of the connection systems is represented in FIGS. 1, 6, 7 and 9.

In a first embodiment of the invention, each of the tie rods 4 is constituted by a bundle of stacked thin metallic strips, strips whose ends are shaped into an eyelet in order to receive the bolts 46 for fixing onto the sleeves 3. In this configuration of the tie rods 4, the thin metallic strips situated on the outside of the bundle are of a smaller width than that of the internal strips, in such a way as to distribute between them the shear stresses due to their torsion. Moreover, in order to avoid contact corrosion between the strips, the latter are covered with an antifriction plastic coating.

In a second embodiment of the invention, each of the tie rods 4 has a cross-section of ellipsoidal shape and is constituted by a skein winding of metallic wires of high mechanical strength sheathed in a flexible material. The wires are, for example, made of steel and the flexible sheathing material is an elastomer.

In a third embodiment of the invention, each of the tie rods 4 has a cross-section of ellipsoidal shape and is constituted by skein winding threads of mineral or synthetic fibers, of high mechanical strength, agglomerated by a synthetic resin which is heat polymerized. The fibers of high mechanical strength are, for example, glass fibers agglomerated by a resin of the epoxy type or, for example, aramid fibers agglomerated by an epoxy resin. Each of the tie rods 4 is obtained by skein winding rovings which are preimpregnated with synthetic resin onto a cylindrical bush 42, arranged at each of their ends, in such a way as to constitute the corresponding fastening member 41, said skein of preimpregnated rovings then being heat polymerized and under tension in a shaped mold.

In all these embodiments of the tie rods 4, the ends of two neighboring tie rods 4 which are linked to the same sleeve 3 are arranged in a laminated structure 43 in order to be integral with each other. This laminated structure 43 comprises a shell 45 made of synthetic fiber fabrics, of high mechanical strength, sheathed in synthetic resin.

The two ends of the neighboring tie rods 4 are thus arranged in this shell 45 which is then filled with filled resin of the type referred to as a "compound" 47, the whole assembly then being heat polymerized and under pressure in a shaped mold.

Each laminated structure 43 of the connection system is mounted into the housing of the corresponding sleeve 3, which is constituted by the internal face 60 of the transverse wall 55, and by the internal faces 58 and 59 of the respective longitudinal walls 56 and 57. Thus, each of the two sleeves 3 caps the two ends of the corresponding tie rods 4 which are integral with the laminated structure 43, and the two fastening members 41 of which are fixed in this sleeve 3 by means of two fixing bolts 46. Each fixing bolt 46 passes through the bore 66 made in the external wall 52 of the sleeve 3, then it engages in the bore 44 made in the bush 42 of the fastening member 41, and finally it passes through the bore 65 made in the internal wall 51 of the sleeve 3.

The mounting of the rotorcraft rotor head according to the invention is carried out in the order described below. A first assembly, which is constituted by the internal connection system with the two tie rods 4 equipped at each of their ends with a sleeve 3, is positioned on the internal part 9 of the hub body 1 which is integral with the drive shaft 6 by means of the footing 21. The two laminated spherical stops 5 of which the internal reinforcement 82 comprises the axial cylindrical housing 89 are positioned via one of the recesses 53 and 54 made in the internal and external walls 51 and 52 with respect to the uptake of movement of each sleeve 3. Then each of the laminated spherical stops 5 is displaced toward the center of the hub body 1, so that the axial cylindrical housing 89 made in the internal reinforcement 82 comes into line with the corresponding cylindrical tenon 72 made in the linking brace 70 with the sleeve 3. In the same way, the second external connection system is positioned with the two tie rods 4 and the two sleeves 3, as well as the corresponding laminated spherical stops 5. The assembly is completed by positioning the cover 10 of the hub body 1, then the bolts 19 for fixing this cover 10 to the internal part 9 of the hub body 1. Finally, the bolts 20 for fixing the external reinforcements 83 of the laminated spherical stops 5 are mounted. The original constitution of the linking brace 70 with the laminated spherical stop 5 allows a possible replacement of this stop which is particularly easy. In fact, the replacement can be carried out by dismantling the two fixing bolts 20 of the external reinforcement 83, and by laterally disengaging, that is to say along the axis of the blade 2, the part where it is embedded into the linking brace 70 of the sleeve 3, in order to allow its passage through one of the recesses 53 and 54 made in the sleeve 3.

The advantage of the device with the connection systems according to the invention is clearly seen in FIGS. 11 to 16 in which the mounting assembly together with the great length of the connection system with respect to the distance between the laminated spherical stops 5, is diagrammatically shown. FIGS. 11 and 12 are diagrammatic views through a plane passing through the rotor axis. FIG. 11 represents the way in which the tie rods 4 work during symmetric flapping of the two blades 2 whilst being statically loaded by tile lift. FIG. 12 is a diagrammatic view which shows the working of the tie rods 4 during antisymmetric flapping of the two blades 2 in vibrational dynamic loading. FIGS. 13 and 14 are views along the plane of the rotor which show the deformation of the tie rods 4 during a symmetric drag which is represented in FIG. 13 under the drag loadings on the blades 2, and during an antisymmetric drag which is represented in FIG. 14 under the static drive loading of the rotor. Finally, FIGS. 15 and 16 are diagrammatic views in perspective which show the displacement and/or the deformation of the tie rods 4 for the general pitch in FIG. 15, and for the cyclic pitch due to the antisymmetric flapping in FIG. 16. It will be noted that, in the latter case, there is no deformation of the tie rods.

Thus, in the architecture of the rotor head in accordance with the invention, the complete dissociation of each pair of tie rods 4 with respect to the hub body 1 and the hyperstatic link of each sleeve 3 with the hub body 1 by means of the laminated spherical stops 5, which are for the most part free from the compressive stresses due to the centrifugal force, make it possible:

for the tie rods 4 to be given a maximum twistable and flexible length as far as the center of the hub body 1, to remove with embedding the tie rods 4 into the hub body 1, and to free the deformation from drag and flapping as much as possible thus leading to a great reduction in the dynamic stresses which load them, to remove, in the flexible inter-blade linking element, any cyclic pitch stress as a result of the absence of dynamic torsion, and consequently, to considerably reduce the forces in the pitch control system, by splitting the centrifugal forces between the two tie rods 4 and the laminated spherical stop 5, to reduce the cross-section of the tie rods 4 and to decrease the torsional stiffness, it being possible for the uncoupled flapping and drag stresses to be much less than those in a rotor with a single strip, by unloading the laminated spherical stops 5 of a major part of the centrifugal force, to very significantly increase their service life, to have very mechanical interfaces between the various components, finally to enable the blades 2 to be dismantled one by one as on articulated hubs.

As a result of these particularities, the advantages offered by this inventive concept are:

an aerodynamic sophistication in the assembly of the hub and blade fastening pieces, especially in comparison with rotors having strips on which a collar covers the blades over their part which links with the current part of the blade, which collar must have a significant internal volume in order to allow the deflection of the strip in torsion, a low mass as a result of the fact that the central part of the metallic hub is not subjected to the centrifugal forces, a capacity for greater speed of the helicopter, all other things being equal, via a reduction in the dynamic stresses in the flexible elements, a reduction in maintenance costs as a result of the absence of drag dampers (maintenance cost for the member itself and for the members for fixing by swivels), significant simplicity in respect of monitoring (visual monitoring for "on condition" maintenance) and of the optional replacement of loaded parts, the complete separation of the blades and the hub enabling proven methods of manufacture for the tie rods and the stops and leading to good modularity in order to limit maintenance costs, an increase in reliability of the control devices since there is no risk of the pitch articulations hardening in service, and in particular as a result of Brinell effect of the roller bearings, and finally an increased life for components working in fatigue.

What is claimed is:

1. A rotorcraft rotor head having a rotor axis and a rotor plane comprising:

an even number of blades arranged in pairs of blades, said blades having a foot portion;

a hub body on which said blades are mounted in diametrically opposed pairs; and rotating means for rotating said blades; each of said pair of blades including, between said foot portion of said blades, a connection which is elastic in torsion and in flapping bending, said connection being without any link with said hub body;

wherein said rotating means includes hollow sleeves each having two ends, and a single laminated spherical stop having a rigid internal reinforcement and a rigid external reinforcement; said single laminated spherical stop including an alternate stacking of rigid spherical caps and of strips made of an elastic material between said rigid internal reinforcement and said rigid external reinforcement, wherein said single laminated spherical stop is in a shape of a portion of a sphere and has an internal end connected to one of said two ends of a respective one of said hollow sleeves, the other one of said two ends of said respective one of said hollow sleeves being directly coupled to said foot portion of a connected one of said pair of blades; said respective one of said hollow sleeves including an introduction lever for controlling a pitch of a connected one of said pair of blades, and being coupled on an end thereof to said hub body by said external reinforcement to a periphery of said hub body on which said single laminated spherical stop bears;

wherein diametrically opposed ones of said hollow sleeves are connected to each other by two identical tie rods arranged in parallel to said rotor plane and are spaced apart on either side of a longitudinal axis which is common to each of said diametrically opposed pairs of blades, each end of each of said tie rods including a bore with an axis substantially parallel to said rotor axis; a bolt passing through each said bore of each of said tie rods for fixing a respective one of each of said sleeves thereto;

wherein each group of two tie rods is disposed in a plane, the planes of each respective said group of two tie rods are arranged parallel to each other with an offset along said rotor axis of sufficient magnitude to allow the free deflection of the respective ones of said tie rods during their bending and torsion in order to follow flapping and change of pitch of said blades, said offset being obtained by a corresponding offset of a position parallel to said rotor axis of a respective said single laminated spherical stop corresponding to each said group of two tie rods on said hub body;

wherein a material composing each of said tie rods, well as dimensions of each of said tie rods, are selected so that said tie rods are flexible in bending in a plane perpendicular to said rotor plane as well as in torsion along a longitudinal axis thereof;

wherein relative rigidity and traction of each said group of two tie rods, linking two diametrically opposed sleeves are in a pre-established ratio, wherein said pre-established ratio is such that centrifugal force originating from each of said blades during rotation is balanced out in proportion to rigidities of a diametrically opposite one of said blades to thereby load the corresponding said two tie rods in traction;

each of said tie rods is a bundle of stacked thin metallic strips;

wherein the metallic strips situated on the outside of the bundle have a smaller width than that of internal strips so as to distribute therebetween the shear stresses due to torsions thereof.

2. A rotorcraft rotor head having a rotor axis and a rotor plane, comprising:

an even number of blades arranged in pairs of blades, said blades having a foot portion;

a hub body on which said blades are mounted in diametrically opposed pairs; and rotating means for rotating said blades; each of said pair of blades including, between said foot portion of said blades, a connection which is elastic in torsion and in flapping bending, said connection being without any link with said hub body;

wherein said rotating means includes hollow sleeves each having two ends, and a single laminated spherical stop having a rigid internal reinforcement and a rigid external reinforcement; said single laminated spherical stop including an alternate stacking of rigid spherical caps and of strips made of an elastic material between said rigid internal reinforcement and said rigid external reinforcement, wherein said single laminated spherical stop is in a shape of a portion of a sphere and has an internal end connected to one of said two ends of a respective one of said hollow sleeves, the other one of said two ends of said respective one of said hollow sleeves being directly coupled to said foot portion of a connected one of said pair of blades; said respective one of said hollow sleeves including an introduction lever for controlling a pitch of a connected one of said pair of blades, and being coupled on an end thereof to said hub body by said external reinforcement to a periphery of said hub body on which said single laminated spherical stop bears;

wherein diametrically opposed ones of said hollow sleeves are connected to each other by two identical tie rods arranged in parallel to said rotor plane and are spaced apart on either side of a longitudinal axis which is common to each of said diametrically opposed pairs of blades, each end of each of said tie rods including a bore with an axis substantially parallel to said rotor axis; a bolt passing through each said bore of each of said tie rods for fixing a respective one of each of said sleeves thereto;

wherein each group of two tie rods is disposed in a plane, the planes of each respective said group of two tie rods are arranged parallel to each other with an offset along said rotor axis of sufficient magnitude to allow the free deflection of the respective ones of said tie rods during their bending and torsion in order to follow flapping and change of pitch of said blades, said offset being obtained by a corresponding offset of a position parallel to said rotor axis of a respective said single laminated spherical stop corresponding to each said group of two tie rods on said hub body;

wherein a material composing each of said tie rods, as well as dimensions of each of said tie rods, are selected so that said tie rods are flexible in bending in a plane perpendicular to said rotor plane as well as in torsion along a longitudinal axis thereof;

wherein relative rigidity and traction of each said group of two tie rods, linking two diametrically opposed sleeves are in a pre-established ratio, wherein said pre-established ratio is such that centrifugal force originating from each of said blades during rotation is balanced out in proportion to rigidities of a diametrically opposite one of said blades to thereby load the corresponding said two tie rods in traction;

each of said tie rods is a bundle of stacked thin metallic strips;

wherein ones of said stacked thin metallic strips which are situated on the outside of the bundle have a smaller width than that of internal strips so as to distribute therebetween the shear stresses due to torsions thereof; and wherein said stacked thin metallic strips are covered with an antifriction plastic coating in order to avoid contact corrosion.

3. A rotorcraft rotor head having a rotor axis and a rotor plane, comprising:

an even number of blades arranged in pairs of blades, said blades having a foot portion;

a hub body on which said blades are mounted in diametrically opposed pairs; and rotating means for rotating said blades; each of said pair of blades including, between said foot portion of said blades, a connection which is elastic in torsion and in flapping bending, said connection being without any link with said hub body;

wherein said rotating means includes hollow sleeves each having two ends, and a single laminated spherical stop having a rigid internal reinforcement and a rigid external reinforcement; said single laminated spherical stop including an alternate stacking of rigid spherical caps and of strips made of an elastic material between said rigid internal reinforcement and said rigid external reinforcement, wherein said single laminated spherical stop is in a shape of a portion of a sphere and has an internal end connected to one of said two ends of a respective one of said hollow sleeves, the other one of said two ends of said respective one of said hollow sleeves being directly coupled to said foot portion of a connected one of said pair of blades; said respective one of said hollow sleeves including an introduction lever for controlling a pitch of a connected one of said pair of blades, and being coupled on an end thereof to said hub body by said external reinforcement to a periphery of said hub body on which said single laminated spherical stop bears;

wherein diametrically opposed ones of said hollow sleeves are connected to each other by two identical tie rods arranged in parallel to said rotor plane and are spaced apart on either side of a longitudinal axis which is common to each of said diametrically opposed pairs of blades, each end of each of said tie rods including a bore with an axis substantially parallel to said rotor axis; a bolt passing through each said bore of each of said tie rods for fixing a respective one of each of said sleeves thereto;

wherein each group of two tie rods is disposed in a plane, the planes of each respective said group of two tie rods are arranged parallel to each other with an offset along said rotor axis of sufficient magnitude to allow the free deflection of the respective ones of said tie rods during their bending and torsion in order to follow flapping and change of pitch of said blades, said offset being obtained by a corresponding offset of a position parallel to said rotor axis of a respective said single laminated spherical stop corresponding to each said group of two tie rods on said hub body;

wherein a material composing each of said tie rods, as well as dimensions of each of said tie rods, are selected so that said tie rods are flexible in bending in a plane perpendicular to said rotor plane as well as in torsion along a longitudinal axis thereof;

wherein relative rigidity and traction of each said group of two tie rods, linking two diametrically opposed sleeves are in a pre-established ratio, wherein said pre-established ratio is such, that centrifugal force originating from each of said blades during rotation is balanced out in proportion to rigidities of a diametrically opposite one of said blades to thereby load the corresponding said two tie rods in traction;

wherein each said bolt respectively fastening each tie rod to each sleeve is arranged on the outside of the laminated spherical stop with respect to the rotor axis, in such a way that the length of the two tie rods is significantly greater than the distance between two diametrically opposed laminated spherical stops;

wherein the ends of two neighboring tie rods which are linked to the same sleeve are integral with each other;

wherein the ends of two neighboring tie rods linked to the same sleeve comprise a laminated structure in order to be integral with each other; and wherein the laminated structure comprises a shell made of synthetic fiber fabrics, sheathed in a synthetic resin and having a filling, said laminated structure being heat polymerized under pressure in a shaped mold; wherein each of the sleeves caps the two ends of the corresponding tie rods which themselves are integral with the laminated structure, and the fastening members of which are fixed into said sleeves by the two bolts which pass through bores made in the two bushes.

4. A rotorcraft rotor head having a rotor axis and a rotor plane, comprising:

an even number of blades arranged in pairs of blades, said blades having a foot portion;

a hub body on which said blades are mounted in diametrically opposed pairs; and rotating means for rotating said blades; each of said pair of blades including, between said foot portion of said blades, a connection which is elastic in torsion and in flapping bending, said connection being without any link with said hub body;

wherein said rotating means includes hollow sleeves each having two ends, and a single laminated spherical stop having a rigid internal reinforcement and a rigid external reinforcement; said single laminated spherical stop including an alternate stacking of rigid spherical caps and of strips made of an elastic material between said rigid internal reinforcement and said rigid external reinforcement, wherein said single laminated spherical stop is in a shape of a portion of a sphere and has an internal end connected to one of said two ends of a respective one of said hollow sleeves, the other one of said two ends of said respective one of said hollow sleeves being directly coupled to said foot portion of a connected one of said pair of blades; said respective one of said hollow sleeves including an introduction lever for controlling a pitch of a connected one of said pair of blades, and being coupled on an end thereof to said hub body by said external reinforcement to a periphery of said hub body on which said single laminated spherical stop bears;

wherein diametrically opposed ones of said hollow sleeves are connected to each other by two identical tie rods arranged in parallel to said rotor plane and are spaced apart on either side of a longitudinal axis which is common to each of said diametrically opposed pairs of blades, each end of each of said tie rods including a bore with an axis substantially parallel to said rotor axis; a bolt passing through each said bore of each of said tie rods for fixing a respective one of each of said sleeves thereto;

wherein each group of two tie rods is disposed in a plane, the planes of each respective said group of two tie rods are arranged parallel to each other with an offset along said rotor axis of sufficient magnitude to allow the free deflection of the respective ones of said tie rods during their bending and torsion in order to follow flapping and change of pitch of said blades, said offset being obtained by a corresponding offset of a position parallel to said rotor axis of a respective said single laminated spherical stop corresponding to each said group of two tie rods on said hub body;

wherein a material composing each of said tie rods, as well as dimensions of each of said tie rods, are selected so that said tie rods are flexible in bending in a plane perpendicular to said rotor plane as well as in torsion along a longitudinal axis thereof;

wherein relative rigidity and traction of each said group of two tie rods, linking two diametrically opposed sleeves are in a pre-established ratio, wherein said pre-established ratio is such that centrifugal force originating from each of said blades during rotation is balanced out in proportion to rigidities of a diametrically opposite one of said blades to thereby load the corresponding said two tie rods in traction;

wherein an integral fixing of the internal reinforcement of the laminated spherical stop to the internal end of the sleeve includes two through bolts having axes thereof which are parallel to each other and parallel to the rotor axis;

wherein the internal reinforcement of each laminated spherical stop is mounted in a linking brace which is integral with the corresponding sleeve by the two fixing bolts, said linking brace having bores, and wherein said two fixing bolts pass through said bores in said linking brace; and wherein the internal reinforcement of each laminated spherical stop comprises an axial cylindrical housing which receives a corresponding cylindrical tenon made on the linking brace, the axis of the axial cylindrical housing and of the tenon being substantially parallel to the longitudinal axis of the sleeve and of the corresponding blade.

5. A rotorcraft rotor head having a rotor axis and a rotor plane comprising:

an even number of blades arranged in pairs of blades, said blades having a foot portion;

a hub body on which said blades are mounted in diametrically opposed pairs; and rotating means for rotating said blades; each of said pair of blades including, between said foot portion of said blades, a connection which is elastic in torsion and in flapping bending, said connection being without any link with said hub body;

wherein said rotating means includes hollow sleeves each having two ends, and a single laminated spherical stop having a rigid internal reinforcement and a rigid external reinforcement; said single laminated spherical stop including an alternate stacking of rigid spherical caps and of strips made of an elastic material between said rigid internal reinforcement and said rigid external reinforcement, wherein said single laminated spherical stop is in a shape of a portion of a sphere and has an internal end connected to one of said two ends of a respective one of said hollow sleeves, the other one of said two ends of said respective one of said hollow sleeves being directly coupled to said foot portion of a connected one of said pair of blades; said respective one of said hollow sleeves including an introduction lever for controlling a pitch of a connected one of said pair of blades, and being coupled on an end thereof to said hub body by said external reinforcement to a periphery of said hub body on which said single laminated spherical stop bears;

wherein diametrically opposed ones of said hollow sleeves are connected to each other by two identical tie rods arranged in parallel to said rotor plane and are spaced apart on either side of a longitudinal axis which is common to each of said diametrically opposed pairs of blades, each end of each of said tie rods including a bore with an axis substantially parallel to said rotor axis; a bolt passing through each said bore of each of said tie rods for fixing a respective one of each of said sleeves thereto;

wherein each group of two tie rods is disposed in a plane, the planes of each respective said group of two tie rods are arranged parallel to each other with an offset along said rotor axis of sufficient magnitude to allow the free deflection of the respective ones of said tie rods during their bending and torsion in order to follow flapping and change of pitch of said blades, said offset being obtained by a corresponding offset of a position parallel to said rotor axis of a respective said single laminated spherical stop corresponding to each said group of two tie rods on said hub body;

wherein a material composing each of said tie rods, as well as dimensions of each of said tie rods, are selected so that said tie rods are flexible in bending in a plane perpendicular to said rotor plane as well as in torsion along a longitudinal axis thereof;

wherein relative rigidity and traction of each said group of two tie rods, linking two diametrically opposed sleeves are in a pre-established ratio, wherein said pre-established ratio is such that centrifugal force originating from each of said blades during rotation is balanced out in proportion to rigidities of a diametrically opposite one of said blades to thereby load the corresponding said two tie rods in traction; and wherein the hub body is a hollow cylinder arranged at the end of rotor shaft and in which are housed the tie rods linking the diametrically opposed sleeves as well as the laminated spherical stops, and the hollow cylinder including radial openings for the passage of the sleeves, said hub body including two parts: one internal part and one external part, the internal part being connected to the rotor shaft by a flared zone in the shape of a conical frustum, and the external part being in the shape of a cover which is integral with the internal part, by means of bolts which are arranged in bores made on portions of flanges situated on a perimeter of the internal part and of the cover in the shape of a crown, by means of bolts arranged in bores drilled in said external reinforcements of the laminated spherical stops, and in bores made in alignment with flange elements situated on the perimeter of the internal part and of the cover, near to a central zone of recesses of the sleeves, the bolts thus integrally fixing the external reinforcements of the laminated spherical stops on the periphery of the hub body.

6. The rotorcraft rotor head as claimed in claim 5, wherein the internal reinforcement of each laminated spherical stop has an axial cylindrical housing and is mounted in a linking brace which is integral with the corresponding sleeve, said linking brace having bores; and wherein each internal reinforcement of the laminated spherical stop has a parallelepipedal shape and is attached, along a plane perpendicular to a common axis of the sleeve and the blade, to the linking brace by a cylindrical tenon engaged in the axial cylindrical housing made in said internal reinforcement in such a way that said laminated spherical stop can be mounted and dismantled easily after the bolts have been removed and the cover of the hub body has been dismantled.

7. A rotorcraft rotor head having a rotor axis and a rotor plane, comprising:

an even number of blades arranged in groups of two blades which are diametrically opposed to each other;

a hub body on which said blades are mounted in diametrically opposed pairs, said hub body having a periphery;

a connection system respectively linking each of said diametrically opposed pairs of blades, wherein said connection system is without any link with said hub body, wherein:

each blade has a root and is articulated in flapping and in pitch on said hub body by a sleeve which is disposed between said root of said blade and said hub body, a laminated spherical stop is carried by said sleeve, and said sleeve bears against said periphery of said hub body by said laminated spherical stop, and said sleeve further comprising an introduction member for controlling pitch of said blade;

each said system for connecting two diametrically opposed blades includes two tie rods linking said two diametrically opposed sleeves of said two diametrically opposed blades, said two tie rods being parallel to said rotor plane on either side of a longitudinal axis which is common to said two diametrically opposed blades, said two tie rods being parallel and spaced apart in a direction along said common longitudinal axis;

a member fastening said two tie rods to each sleeve, said member being disposed on an opposite side of each said laminated spherical stop from said rotor axis and such that a length of each of said two tie rods is significantly greater than a distance between centers of diametrically opposed ones of said laminated spherical stops;

each of said sleeves respectively caps an end of each corresponding one of said tie rods;

two bolts connecting said end of each corresponding one of said tie rods into a corresponding said sleeve;

each of said laminated spherical stops comprises a central part, which can be deformed in torsion, and having an internal reinforcement and an external reinforcement, said internal reinforcement being integral with an internal end of corresponding said sleeve, and said external reinforcement being linked to said periphery of said hub body;

said tie rods are relatively rigid in tension along their respective longitudinal axes and are flexible in bending in a plane perpendicular to said plane of said rotor as well as in torsion along their respective longitudinal axes;

a relative rigidity in tension of said two tie rods, and a relative rigidity in compression of said two laminated spherical stops installed between the corresponding said sleeves and said hub body, are in a predetermined ratio such that centrifugal force arising due to rotation of each rotating blade is balanced out in proportion to said relative rigidity in tension and said relative rigidity in compression in part by the diametrically opposite blade, thus loading said two tie rods in traction, and is balanced out in a remaining part by said hub body via the corresponding one of said laminated spherical stops, which is loaded in compression;

each group of two tie rods lying in a respective plane, wherein said respective planes of each group of two tie rods are parallel to each other with a slight offset along said rotor axis of sufficient amount to allow free defection of said tie rods during bending and torsion thereof in order to follow flapping and change of pitch of said blades, said offset being in a direction along said rotor axis.

8. The rotorcraft head as claimed in claim 7, wherein said end of each respective tie rod is linked to the corresponding said sleeve by disposition of said bolt through bores formed in said end of said tie rod and in said sleeve, said bores having axes which are substantially parallel to said rotor 9. The rotorcraft rotor head as claimed in one of claims 7 to 8, wherein each of said tie rods is composed of a bundle of stacked thin metallic strips whose ends include an eyelet for receiving one of said bolts for linking said ends of said tie rods to the respective said sleeve.

10. The rotorcraft rotor head as claimed in claim 9, wherein ones of said thin metallic strips are disposed on an outside of said bundle and are of a smaller width than interior ones of said thin metallic strips, so as to distribute shear stresses therebetween caused by torsion thereof.

11. The rotorcraft rotor head as claimed in claim 9, wherein said thin metallic strips are covered by an antifriction plastic coating in order to prevent contact corrosion.

12. The rotorcraft rotor head as claimed in claims 7 or 8, wherein each of said tie rods is composed of a skein winding of metal wires having relatively high mechanical strength sheathed in a flexible material.

13. The rotorcraft rotor head as claimed in claim 12, wherein said metal wires are composed of steel, and said flexible sheathing material is composed of an elastomer.

14. The rotorcraft rotor head as claimed in claim 7 or 8, wherein each of said tie rods is composed of a skein winding of threads of mineral or synthetic fibers of relatively high mechanical strength agglomerated by a heat polymerized synthetic resin.

15. The rotorcraft rotor head as claimed in claim 14, wherein said fibers are glass fibers, and wherein said resin is an epoxy resin.

16. The rotorcraft rotor head as claimed in claim 14, wherein said fibers are aramid fibers, and wherein said resin is an epoxy resin.

17. The rotorcraft rotor head as claimed in claim 14, wherein each of said tie rods has a cross-section of ellipsoidal shape.

18. The rotorcraft rotor head as claimed in claim 14, wherein each of said tie rods is formed by skein winding rovings preimpregnated with synthetic resin onto a cylindrical bush, arranged at each of their ends, so as to constitute a fastening portion, said skein of preimpregnated rovings then being heat polymerized under tension in a shaped mold.

19. The rotorcraft rotor head claimed in claim 15, wherein said ends of two neighboring tie rods linked to a same sleeve are integral with each other.

20. The rotorcraft rotor head as claimed in claim 19, wherein said ends of two neighboring tie rods linked to the same sleeve are arranged in a laminated structure so as to be integral with each other.

21. The rotorcraft rotor head as claimed in claim 20, wherein said laminated structure comprises a shell made of synthetic fiber fabrics, of relatively high mechanical strength, sheathed in a synthetic resin and having a filling of a compound, said laminated structure being heat polymerized under pressure in a shaped mold.

22. The rotorcraft rotor head as claimed in claim 21, wherein two through bolts perform integral fixing of said internal reinforcement of said laminated spherical stop to said internal end of said sleeve, said two through bolts having axes which are parallel to each other and which are parallel to said rotor axis.

23. The rotorcraft rotor head as claimed in claim 22, wherein said internal reinforcement of each laminated spherical stop is mounted in a linking brace which is integral with the corresponding sleeve by said two through bolts, which pass through bores in said linking brace.

24. The rotorcraft rotor head as claimed in claim 23, wherein said internal reinforcement of each laminated spherical stop comprises an axial cylindrical housing which receives a corresponding cylindrical tenon made on said linking brace, said axis of said axial cylindrical housing and said tenon being substantially parallel to said longitudinal axis of said sleeve and of said corresponding blade.

25. The rotorcraft rotor head as claimed in claim 7 or claim 8, wherein each sleeve has two ends each of said ends of said sleeves is shaped into a double clevis and is linked to the corresponding one of said blades by two parallel spindles whose axes are substantially parallel to said rotor axis, and wherein said spindles pass through bores in said double clevis at one end of said sleeve and through bores in said root of said blade.

26. The rotorcraft rotor head as claimed in claim 7 or claim 8, wherein each sleeve is composed of an elongated tubular body of oval cross-section whose longitudinal axis is substantially that of the corresponding one of said blades and which comprises an internal wall, an external wall and two longitudinal walls, and an outer end of said sleeve is closed by a relatively thin stiffening transverse wall, and which includes two recesses in its internal and external walls, said two recesses being disposed opposite to each other for passage of said laminated spherical stop, said tubular body further comprising:

- at said inner end of said tubular body, a double clevis having branches to fix a linking brace by means of two fixing bolts which pass through bores in said branches of said double clevis;
- at an outer end of said tubular body, beyond said thin stiffening wall, a double clevis having branches in which said root of said corresponding blade is mounted, two bores being disposed in each of said branches and being opposite and substantially parallel to said rotor axis, so as to receive two spindles for fastening said blade;
- in an intermediate central part of said tubular body and near said thin transverse stiffening wall, bores are disposed having axes substantially parallel to said rotor axis, and intended to receive said two bolts for fixing said fastening members of said tie rods,
- on one of said longitudinal walls situated in a plane perpendicular to said plane of said rotor, two lugs are disposed face to face with each other and perpendicular to said wall, so as to constitute a clevis to receive an articulated fastening member of a corresponding blade pitch control connecting rod.

27. The rotorcraft rotor head as claimed in claim 26, wherein said hub body is a hollow cylinder arranged at an end of a rotor shaft and in which are housed said tie rods linking said diametrically opposed sleeves as well as said laminated spherical stops, said cylinder comprising radial openings for passage of said sleeves; said hub body being composed of two parts including one internal part and one external part, said internal part being connected to said rotor shaft by a flared zone in a shape of a conical frustum, and said external part being in a shape of a cover which is integral with said internal part by bolts disposed in bores in portions of flanges situated on a perimeter of said internal part and in said cover and by bolts disposed in bores in said external reinforcements of said laminated spherical stops and in bores in alignment with said flange elements situated on a perimeter of said internal part and on a perimeter of said cover, near a central zone of said recesses of said sleeves, said bolts thus integrally fixing said external reinforcements of said laminated spherical stops on said periphery of said hub body.

28. The rotorcraft rotor head as claimed in claim 27, wherein each internal reinforcement of said laminated spherical stop has a parallelepipedal shape and is attached along a plane perpendicular to a common axis of said sleeve and said blade to said linking brace by cylindrical tenon engaged in an axial cylindrical housing of said laminated spherical stop, such that said laminated spherical stop can be mounted and dismantled easily via said external recess after said bolts have been removed and after said cover of said hub body has been dismantled.

29. The rotorcraft rotor head as claimed in claim 7 or claim 8, wherein said hub body forms part of a rear rotor head of a helicopter.

30. The rotorcraft rotor head as claimed in claim 25, wherein said hub body forms part of a rear rotor head of a helicopter, wherein pitch control of said blade is produced by a control plate equipped with arms which moves along said rotor axis, and wherein an end of each arm is linked to a clevis of said sleeve by a swivel-ended connecting rod.

* * * * *